(12) United States Patent
Sato (10) Patent No.: US 12,055,084 B2
(45) Date of Patent: Aug. 6, 2024

(54) EXHAUST GAS PURIFICATION APPARATUS

(71) Applicant: SUBARU CORPORATION, Tokyo (JP)

(72) Inventor: Ko Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/138,304

(22) Filed: Apr. 24, 2023

(65) Prior Publication Data
US 2023/0366338 A1 Nov. 16, 2023

(30) Foreign Application Priority Data
May 11, 2022 (JP) ................................. 2022-078028

(51) Int. Cl.
*F01N 3/10* (2006.01)
*F01N 3/20* (2006.01)

(52) U.S. Cl.
CPC ............... *F01N 3/101* (2013.01); *F01N 3/20* (2013.01); *F01N 2370/02* (2013.01); *F01N 2900/1624* (2013.01)

(58) Field of Classification Search
CPC ...... F01N 3/101; F01N 13/009; F01N 3/0864; F01N 2570/16; F01N 13/0097; F01N 2900/1624
See application file for complete search history.

(56) References Cited

U.S. PATENT DOCUMENTS

| | | | |
|---|---|---|---|
| 2003/0051449 A1* | 3/2003 | Nishiyama | F01N 13/011 55/482 |
| 2007/0219088 A1* | 9/2007 | Chigapov | B01J 23/894 502/303 |
| 2008/0207438 A1* | 8/2008 | Suzuki | B01J 23/63 422/177 |
| 2009/0208383 A1* | 8/2009 | Tanada | B01J 37/0244 422/177 |
| 2010/0107611 A1* | 5/2010 | Cleary | F01N 13/009 60/299 |
| 2017/0241312 A1* | 8/2017 | Cudmore | F01N 3/0222 |
| 2018/0163597 A1* | 6/2018 | Xue | B01D 53/9418 |
| 2020/0116061 A1* | 4/2020 | Hupfeld | B60N 2/002 |
| 2020/0232364 A1* | 7/2020 | Baron Von Ceumern-Lindenstjerna | F01N 9/00 |

FOREIGN PATENT DOCUMENTS

JP 2012-255348 A 12/2012

* cited by examiner

*Primary Examiner* — Anthony Ayala Delgado
(74) *Attorney, Agent, or Firm* — MCGINN I.P. LAW GROUP, PLLC.

(57) ABSTRACT

An exhaust gas purification apparatus includes a first exhaust pipe, a first housing, a second exhaust pipe, and a second housing. The first exhaust pipe is coupled to an engine. The first housing is coupled to a downstream end of the first exhaust pipe and houses a three-way catalyst. The second exhaust pipe is coupled to a downstream end of the first housing. The second housing is coupled to a downstream end of the second exhaust pipe and houses a nitrogen oxide occlusion catalyst. The three-way catalyst comprises a first region and a second region. The second region has a lower oxygen storage capacity than the first region. The first region is located on a center axis of a flow of gas that is to be sent from the first exhaust pipe into the first housing.

18 Claims, 4 Drawing Sheets

EXHAUST GAS PURIFICATION APPARATUS

CROSS-REFERENCE TO RELATED APPLICATIONS

The present application claims priority from Japanese Patent Application No. 2022-078028 filed on May 11, 2022, the entire contents of which are hereby incorporated by reference.

BACKGROUND

The disclosure relates to an exhaust gas purification apparatus.

Exhaust gas purification apparatuses configured to purify exhaust gas discharged from engines employ various catalysts for purifying hazardous components of the exhaust gas. Examples of such catalysts include a nitrogen oxide occlusion catalyst, which is capable of occluding nitrogen oxide (hereinafter also abbreviated to NOx) contained in the exhaust gas. In the nitrogen oxide occlusion catalyst, the capacity of occluding NOx (hereinafter referred to as NOx occlusion capacity) is reduced with an increase in the amount of NOx occluded by the nitrogen oxide occlusion catalyst (hereinafter referred to as the amount of NOx occlusion). Therefore, according to Japanese Unexamined Patent Application Publication No. 2012-255348, for example, a process called NOx purge is to be performed in which the air-fuel ratio of the exhaust gas is temporarily enriched. In the process of NOx purge, the NOx occluded in the nitrogen oxide occlusion catalyst is purified by reduction. Thus, the NOx occlusion capacity of the nitrogen oxide occlusion catalyst is recovered.

SUMMARY

An aspect of the disclosure provides an exhaust gas purification apparatus including a first exhaust pipe, a first housing, a second exhaust pipe, and a second housing. The first exhaust pipe is coupled to an engine. The first housing is coupled to a downstream end of the first exhaust pipe and houses a three-way catalyst. The second exhaust pipe is coupled to a downstream end of the first housing. The second housing is coupled to a downstream end of the second exhaust pipe and houses a nitrogen oxide occlusion catalyst. The three-way catalyst comprises a first region and a second region. The second region has a lower oxygen storage capacity than the first region. The first region is located on a center axis of a flow of gas that is to be sent from the first exhaust pipe into the first housing.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In some cases, the three-way catalyst provided in an exhaust-gas passageway communicating with the engine is located on the upstream side relative to the nitrogen oxide occlusion catalyst. The three-way catalyst has a capacity of storing oxygen, which is referred to as oxygen storage capacity (OSC). In times of NOx purge, enriched exhaust gas passes through the three-way catalyst, where some of the components of the exhaust gas that are used for NOx purification react with oxygen stored in the three-way catalyst. Therefore, the amount of fuel consumed for NOx purification increases, which reduces fuel efficiency.

In view of the above, it is desirable to provide an exhaust gas purification apparatus configured to achieve increased fuel efficiency.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Overview of Intake-Exhaust System for Vehicle

Figure 1:
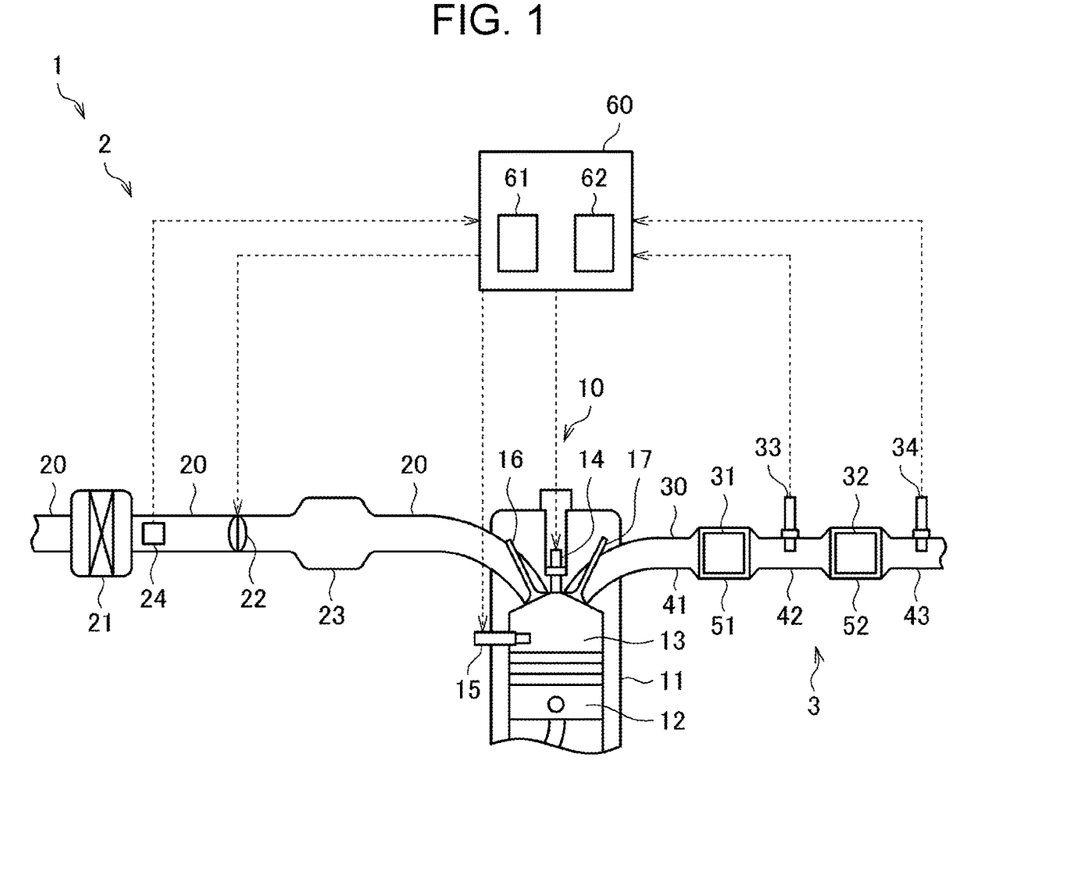
FIG. 1 schematically illustrates an intake-exhaust system for a vehicle according to an embodiment of the disclosure.
Figure 2:
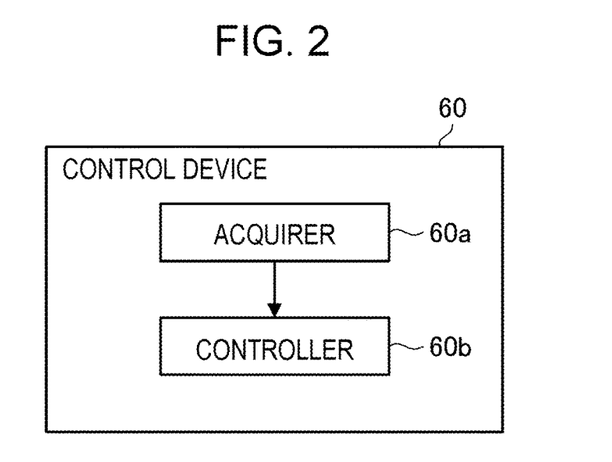
FIG. 2 is a block diagram illustrating an exemplary functional configuration of a control device according to the embodiment of the disclosure.
Figure 3:
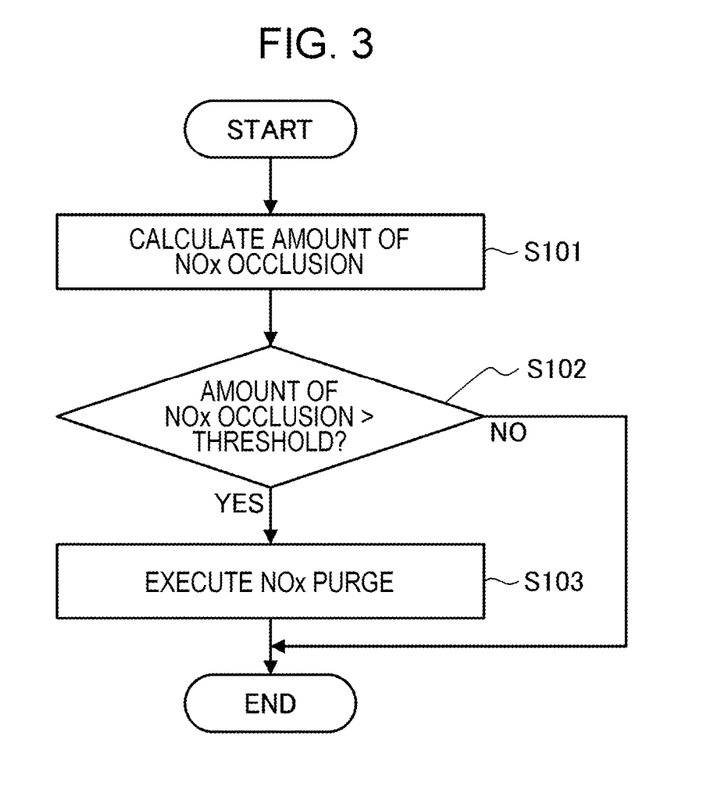
FIG. 3 is a flow chart of an exemplary processing operation to be performed by the control device according to the embodiment of the disclosure.

An intake-exhaust system 2 for a vehicle 1 according to an embodiment of the disclosure will first be overviewed with reference to FIGS. 1 to 3. According to the present embodiment of the disclosure, the intake-exhaust system 2 for the vehicle 1 includes an exhaust gas purification apparatus 3.

FIG. 1 schematically illustrates the intake-exhaust system 2 for the vehicle 1. As illustrated in FIG. 1, the intake-exhaust system 2 includes an engine 10, an intake-air passageway 20, and an exhaust-gas passageway 30.

The engine 10 is, for example, a spark-ignition internal combustion engine. The engine 10 includes one or more cylinders 11. In FIG. 1, for simplicity, one of multiple cylinders 11 included in the engine 10 is illustrated. Each cylinder 11 is provided with a piston 12, which is slidable thereinside. The cylinder 11 has a combustion chamber 13 thereinside. The combustion chamber 13 is defined by the inner surface of the cylinder 11 and the crown surface of the piston 12. The cylinder 11 is provided with a spark plug 14, which faces the combustion chamber 13. The cylinder 11 is further provided with a fuel injection valve 15, through which fuel is to be injected into the combustion chamber 13. In the combustion chamber 13, an air-fuel mixture is to be generated. The air-fuel mixture is to be ignited by the spark plug 14 for combustion. The combustion causes the piston 12 in the cylinder 11 to make a linear reciprocating motion, and the power of the reciprocating motion is transmitted to a crankshaft, which is connected to the piston 12.

The fuel injection valve 15 is not limited to the one configured to directly inject fuel into the combustion chamber 13. For example, the fuel injection valve 15 may be provided to the intake-air passageway 20 so as to inject fuel into the intake-air passageway 20. In such a case, the fuel is taken into the combustion chamber 13 together with air.

The combustion chamber 13 of the engine 10 communicates with the intake-air passageway 20 through an intake port and also communicates with the exhaust-gas passageway 30 through an exhaust port. The cylinder 11 is provided with an intake valve 16, which is capable of opening and closing the intake port; and an exhaust valve 17, which is capable of opening and closing the exhaust port. When the intake valve 16 is activated, intake air is supplied into the combustion chamber 13. When the exhaust valve 17 is activated, exhaust gas is discharged from the combustion chamber 13.

The intake-air passageway 20 is a passageway that is coupled to the engine 10 and through which air to be supplied to the combustion chamber 13 of the engine 10 flows. The intake-air passageway 20 has at the upstream end thereof an air inlet (not illustrated), through which outdoor air is taken from the outside of the vehicle 1. A portion of the intake-air passageway 20 that is on the downstream side relative to the air inlet is provided with an air filter 21. The air filter 21 removes foreign matter from the air taken into the intake-air passageway 20. A portion of the intake-air passageway 20 that is on the downstream side relative to the air filter 21 is provided with a throttle valve 22. The throttle valve 22 adjusts the flow rate of the intake air to be sent through the intake-air passageway 20 to the engine 10. The flow rate of the intake air to be sent to the engine 10 changes with the opening degree of the throttle valve 22.

A portion of the intake-air passageway 20 that is on the downstream side relative to the throttle valve 22 is provided with a surge tank 23. The surge tank 23 temporarily stores the intake air to be sent to the engine 10. A portion of the intake-air passageway 20 that is on the downstream side relative to the surge tank 23 is provided with an intake manifold (not illustrated). The intake manifold branches out to be coupled to the intake ports of the cylinders 11 of the engine 10.

Outdoor air is taken into the intake-air passageway 20 through the air inlet. The air thus taken in passes through the air filter 21, the throttle valve 22, and the surge tank 23 in that order and is sent to the engine 10.

The intake-air passageway 20 is provided with an air flowmeter 24. The air flowmeter 24 detects the amount of intake air, which is regarded as the flow rate of the air taken into the intake-air passageway 20 and flowing through the intake-air passageway 20. The air flowmeter 24 is disposed at, for example, a position between the air filter 21 and the throttle valve 22.

The exhaust-gas passageway 30 is a passageway that is coupled to the engine 10 and through which exhaust gas discharged from the combustion chamber 13 of the engine 10 flows. The exhaust-gas passageway 30 has at the downstream end thereof an air outlet (not illustrated), through which the exhaust gas is discharged to the outside of the vehicle 1. The exhaust-gas passageway 30 is provided with an exhaust manifold (not illustrated). The exhaust manifold branches out to be coupled to the exhaust ports of the cylinders 11 of the engine 10.

A portion of the exhaust-gas passageway 30 that is on the downstream side relative to the exhaust manifold is provided with a three-way catalyst 31. The three-way catalyst 31 oxidizes hydrocarbon (HC) and carbon monoxide (CO) contained in the exhaust gas and reduces NOx in the exhaust gas, thereby purifying such hazardous components into nonhazardous components: vapor ($H_2O$), carbon dioxide ($CO_2$), and nitrogen ($N_2$). The three-way catalyst 31 has a capacity of storing oxygen, which is referred to as oxygen storage capacity (OSC). The OSC is exerted by components, such as ceria ($CeO_2$), contained in the three-way catalyst 31.

A portion of the exhaust-gas passageway 30 that is on the downstream side relative to the three-way catalyst 31 is provided with a nitrogen oxide occlusion catalyst 32. The nitrogen oxide occlusion catalyst 32 is capable of occluding NOx contained in the exhaust gas.

The exhaust gas discharged from the engine 10 passes through the three-way catalyst 31 and the nitrogen oxide occlusion catalyst 32 in that order and is emitted through the air outlet to the outside of the vehicle 1. If the air-fuel ratio of the exhaust gas flowing into the nitrogen oxide occlusion catalyst 32 is lean, that is, greater than the theoretical air-fuel ratio, some of the NOx passes through the three-way catalyst 31 without being purified but is occluded by the nitrogen oxide occlusion catalyst 32.

The exhaust-gas passageway 30 is provided with an upstream-side NOx-concentration sensor 33 and a downstream-side NOx-concentration sensor 34. The upstream-side NOx-concentration sensor 33 is disposed between the three-way catalyst 31 and the nitrogen oxide occlusion catalyst 32 and detects the concentration of NOx contained in the exhaust gas flowing into the nitrogen oxide occlusion catalyst 32. The downstream-side NOx-concentration sensor 34 is disposed at a position of the exhaust-gas passageway 30 that is on the downstream side relative to the nitrogen oxide occlusion catalyst 32 and detects the concentration of NOx contained in the exhaust gas discharged from the nitrogen oxide occlusion catalyst 32.

The exhaust gas purification apparatus 3 includes the three-way catalyst 31, the nitrogen oxide occlusion catalyst 32, the upstream-side NOx-concentration sensor 33, and the downstream-side NOx-concentration sensor 34. The exhaust gas purification apparatus 3 further includes the exhaust-gas passageway 30, which includes a first exhaust pipe 41, a second exhaust pipe 42, a third exhaust pipe 43, a first housing 51, and a second housing 52.

The first exhaust pipe 41 is coupled to the engine 10. In one example, the first exhaust pipe 41 is coupled to the exhaust port of the engine 10 with the exhaust manifold in between. The first housing 51 is coupled to the first exhaust pipe 41 on the downstream side of the first exhaust pipe 41. That is, the downstream end of the first exhaust pipe 41 and the upstream end of the first housing 51 are coupled to each other. The first housing 51 houses the three-way catalyst 31.

The second exhaust pipe 42 is coupled to the first housing 51 on the downstream side of the first housing 51. That is, the downstream end of the first housing 51 and the upstream end of the second exhaust pipe 42 are coupled to each other. The second exhaust pipe 42 is provided with the upstream-side NOx-concentration sensor 33. The second housing 52 is coupled to the second exhaust pipe 42 on the downstream side of the second exhaust pipe 42. That is, the downstream end of the second exhaust pipe 42 and the upstream end of the second housing 52 are coupled to each other. The second housing 52 houses the nitrogen oxide occlusion catalyst 32.

The third exhaust pipe 43 is coupled to the second housing 52 on the downstream side of the second housing 52. That is, the downstream end of the second housing 52 and the upstream end of the third exhaust pipe 43 are coupled to each other. The third exhaust pipe 43 is provided with the downstream-side NOx-concentration sensor 34. The third exhaust pipe 43 extends up to the air outlet of the exhaust-gas passageway 30.

The exhaust gas purification apparatus 3 includes a control device 60. The control device 60 includes at least one processor 61 and at least one memory 62. The memory 62 is coupled to the processor 61. The processor 61 includes, for example, a central processing unit (CPU). The memory 62 includes, for example, a read-only memory (ROM), a random access memory (RAM), and the like. The ROM is a storage cell that stores data such as programs and arithmetic parameters to be used by the CPU. The RAM is a storage cell that temporarily stores data such as variables and parameters to be used in processing operations to be performed by the CPU.

The control device 60 communicates with devices included in the intake-exhaust system 2 (for example, the spark plug 14, the fuel injection valve 15, the throttle valve 22, the air flowmeter 24, the upstream-side NOx-concentration sensor 33, and the downstream-side NOx-concentration sensor 34). The communication between the control device 60 and such devices is realized over, for example, a controller area network (CAN).

FIG. 2 is a block diagram illustrating an exemplary functional configuration of the control device 60. As illustrated in FIG. 2, the control device 60 includes, for example, an acquirer 60a and a controller 60b. Processing operations including those described below are to be executed by the processor 61 through the acquirer 60a and the controller 60b. In more detail, the processor 61 executes programs stored in the memory 62, thereby executing various processing operations.

The acquirer 60a acquires relevant information to be used in the processing operations to be executed by the controller 60b and outputs the information to the controller 60b. For example, the acquirer 60a acquires pieces of relevant information from the air flowmeter 24, the upstream-side NOx-concentration sensor 33, and the downstream-side NOx-concentration sensor 34.

The controller 60b controls the operations of relevant devices included in the intake-exhaust system 2. For example, the controller 60b controls the operation of the engine 10. Furthermore, the controller 60b controls the timing of ignition by the spark plug 14. Furthermore, the controller 60b controls the timing and amount of fuel injection by the fuel injection valve 15. Furthermore, the controller 60b controls the opening degree of the throttle valve 22.

The controller 60b configured to control the amount of fuel injection and so forth is capable of controlling the air-fuel ratio of the exhaust gas to be discharged from the engine 10. In one example, the controller 60b is capable of executing NOx purge, in which the air-fuel ratio of the exhaust gas is temporarily enriched to reduce the NOx occluded by the nitrogen oxide occlusion catalyst 32.

The functions of the control device 60 according to the present embodiment may be allocated among multiple devices or to a single device. If the functions of the control device 60 are allocated among multiple devices, the multiple devices may be coupled to one another through a communication bus such as a CAN.

FIG. 3 is a flow chart of an exemplary processing operation to be performed by the control device 60. The processing operation illustrated in FIG. 3 is, for example, repeated at predetermined intervals.

When the processing operation illustrated in FIG. 3 is started, the controller 60b executes step S101 to calculate the amount of NOx occlusion, which refers to the amount of NOx that is occluded by the nitrogen oxide occlusion catalyst 32.

In step S101, for example, the controller 60b calculates the increment in the amount of NOx occlusion per unit time from the results of detection by the air flowmeter 24, the upstream-side NOx-concentration sensor 33, and the downstream-side NOx-concentration sensor 34. One example of the calculation is as follows. The controller 60b is capable of calculating the amount of NOx inflow into the nitrogen oxide occlusion catalyst 32 per unit time from the amount of air intake and the concentration of NOx in the exhaust gas flowing into the nitrogen oxide occlusion catalyst 32. Furthermore, the controller 60b is capable of calculating the amount of NOx outflow from the nitrogen oxide occlusion catalyst 32 per unit time from the amount of air intake and the concentration of NOx in the exhaust gas discharged from the nitrogen oxide occlusion catalyst 32. Furthermore, the controller 60b is capable of calculating the increment in the amount of NOx occlusion per unit time by calculating the difference between the amount of NOx inflow into the nitrogen oxide occlusion catalyst 32 per unit time and the amount of NOx outflow from the nitrogen oxide occlusion catalyst 32 per unit time. The controller 60b adds up the increments in the amount of NOx occlusion per unit time that are each calculated as above, and regards the result as the amount of NOx occlusion.

The controller 60b having executed step S101 proceeds to step S102 to check whether the amount of NOx occlusion is greater than a threshold. The threshold employed in step S102 is set to a value that help determine whether the NOx occlusion capacity of the nitrogen oxide occlusion catalyst 32 has been reduced to such a low level as to be recovered. An amount of NOx occlusion that is greater than the threshold means that the NOx occlusion capacity of the nitrogen oxide occlusion catalyst 32 is to be recovered.

If it is determined that the amount of NOx occlusion is greater than the threshold (YES in step S102), the controller 60b proceeds to step S103, in which NOx purge is executed. Thus, the processing operation illustrated in FIG. 3 ends. If it is determined that the amount of NOx occlusion is not greater than the threshold (NO in step S102), the processing operation illustrated in FIG. 3 ends.

The above description relates to an exemplary case where a single nitrogen oxide occlusion catalyst 32 is provided. Alternatively, two or more nitrogen oxide occlusion catalysts 32 may be provided. In the latter case, the multiple nitrogen oxide occlusion catalysts 32 are disposed in series in a portion of the exhaust-gas passageway 30 that is on the downstream side relative to the three-way catalyst 31, and the exhaust gas discharged from the three-way catalyst 31 passes through the multiple nitrogen oxide occlusion catalysts 32 one by one.

Details of Exhaust Gas Purification Apparatus

The exhaust gas purification apparatus 3 according to the embodiment of the disclosure will further be described with reference to FIGS. 4 to 6.

As described above, the exhaust gas purification apparatus 3 is configured to perform NOx purge to recover the NOx occlusion capacity of the nitrogen oxide occlusion catalyst 32. In times of NOx purge, enriched exhaust gas passes through the three-way catalyst 31, where some of the components of the exhaust gas that are used for NOx purification react with oxygen stored in the three-way catalyst 31. Therefore, the amount of fuel consumed for NOx purification increases, which may reduce fuel efficiency. In view of such circumstances, the three-way catalyst 31 according to the present embodiment is configured to reduce the increase in the amount of fuel to be used for NOx purge so as to increase fuel efficiency. Details of the three-way catalyst 31 and relevant elements disposed therearound will now be described with reference to FIGS. 4 to 6.

Figure 4:
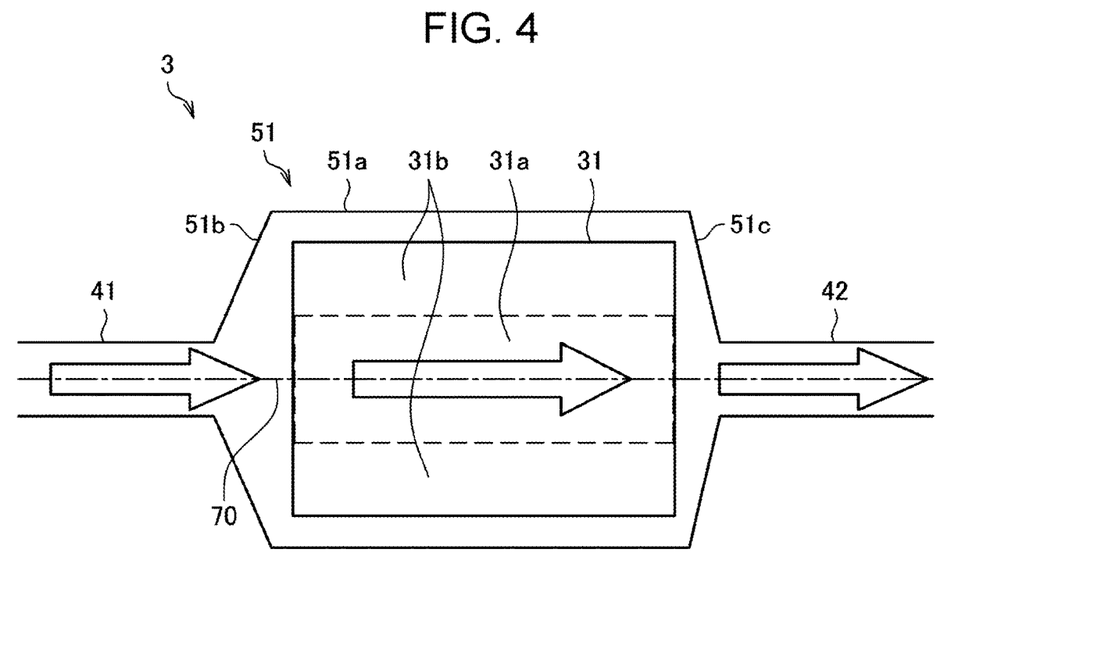
FIG. 4 schematically illustrates how exhaust gas passes through a three-way catalyst in normal times in an exhaust gas purification apparatus according to the embodiment of the disclosure.

FIG. 4 schematically illustrates how exhaust gas passes through the three-way catalyst 31 in normal times in the exhaust gas purification apparatus 3. In FIG. 4 and in FIGS. 5, 7, and 8 to be referred to below, the flow of the exhaust gas is represented by arrows. The normal time refers to a state where NOx purge is not underway. The flow rate of the exhaust gas changes with the air-fuel ratio of the air-fuel mixture in the engine 10. The torque of the engine 10 is basically determined by the amount of fuel supply to the engine 10. Hence, if the torque of the engine 10 is constant, the higher the air-fuel ratio, the greater the flow rate of the exhaust gas. In normal times, the air-fuel ratio is equal to or higher than the theoretical air-fuel ratio. In times of NOx purge, the air-fuel ratio is lower than the theoretical air-fuel ratio. Therefore, the flow rate of the exhaust gas in normal times (for example, in times of lean burn, in which the air-fuel ratio is high) is greater than the flow rate of the exhaust gas in times of NOx purge, in which the air-fuel ratio is low.

As illustrated in FIG. 4, the first housing 51 that houses the three-way catalyst 31 includes a cylindrical portion 51a, a first flared portion 51b, and a second flared portion 51c.

The three-way catalyst 31 is disposed in the cylindrical portion 51a. The three-way catalyst 31 has a round columnar shape. In the case illustrated in FIG. 4, the center axis of the three-way catalyst 31 extends in the horizontal direction. The cylindrical portion 51a has a round cylindrical shape. In the case illustrated in FIG. 4, the center axis of the cylindrical portion 51a extends in the horizontal direction. The inside diameter of the cylindrical portion 51a is greater than the outside diameter of the three-way catalyst 31. The axial length of the cylindrical portion 51a is greater than the axial length of the three-way catalyst 31. The cylindrical portion 51a is coaxial with the three-way catalyst 31. The upstream end (the left end in FIG. 4) of the cylindrical portion 51a is located on the upstream side relative to the upstream end of the three-way catalyst 31. The downstream end (the right end in FIG. 4) of the cylindrical portion 51a is located on the downstream side relative to the downstream end of the three-way catalyst 31. That is, the entirety of the outer peripheral surface of the three-way catalyst 31 faces the inner peripheral surface of the cylindrical portion 51a.

The first flared portion 51b couples the first exhaust pipe 41 and the cylindrical portion 51a to each other and has a diameter increasing from the upstream side toward the downstream side. In the case illustrated in FIG. 4, the first exhaust pipe 41 is coaxial with the cylindrical portion 51a. The first flared portion 51b has a truncated conical shape.

The second flared portion 51c couples the second exhaust pipe 42 and the cylindrical portion 51a to each other and has a diameter increasing from the downstream side toward the upstream side. In the case illustrated in FIG. 4, the second exhaust pipe 42 is coaxial with the cylindrical portion 51a. The second flared portion 51c has a truncated conical shape.

The three-way catalyst 31 includes a first region 31a and a second region 31b, which have different levels of OSC. In FIG. 4, the first region 31a is defined by a broken line. The OSC of the second region 31b is lower than the OSC of the first region 31a. In one example, the concentration of components, such as ceria, for exerting the OSC is lower in the second region 31b than in the first region 31a.

In the case illustrated in FIG. 4, the first region 31a is coaxial with the center axis of the three-way catalyst 31. The first region 31a occupies a radially inner portion of the three-way catalyst 31. The first region 31a has a round columnar shape. The first region 31a extends continuously from the upstream end to the downstream end of the three-way catalyst 31. The second region 31b is a region of the three-way catalyst 31 excluding the first region 31a. The second region 31b occupies a radially outer portion of the three-way catalyst 31. The second region 31b has a round cylindrical shape.

The first region 31a is located on the center axis, 70, of the flow of the gas (in one example, the flow of the exhaust gas) that is sent from the first exhaust pipe 41 into the first housing 51. The flow of the exhaust gas that is sent from the first exhaust pipe 41 into the first housing 51 actually spreads outward in the radial direction from the outlet at the downstream end of the first exhaust pipe 41. The center axis 70 passes through the center of the distribution of the exhaust gas that is sent from the first exhaust pipe 41 into the first housing 51. In other words, the center axis 70 represents the basic direction of the flow of the exhaust gas that is sent from the first exhaust pipe 41 into the first housing 51. The center axis 70 coincides with, for example, the center axis of the first exhaust pipe 41. Accordingly, the first region 31a is located on a virtual line extended from the first exhaust pipe 41. The virtual line extended from the first exhaust pipe 41 refers to a virtual line extending in the direction in which the first exhaust pipe 41 extends. For example, the virtual line is the extension of the center axis of the first exhaust pipe 41.

In normal times, the flow rate of the exhaust gas, represented by the arrows in FIG. 4, is greater than in times of NOx purge, and the exhaust gas that is sent from the first exhaust pipe 41 into the first housing 51 basically flows along the center axis 70 in the first housing 51. Therefore, the exhaust gas basically passes through the first region 31a of the three-way catalyst 31, not the second region 31b. The second exhaust pipe 42 faces the first region 31a in the axial direction of the three-way catalyst 31. Therefore, the exhaust gas having passed through the first region 31a is smoothly sent into the second exhaust pipe 42.

Figure 5:
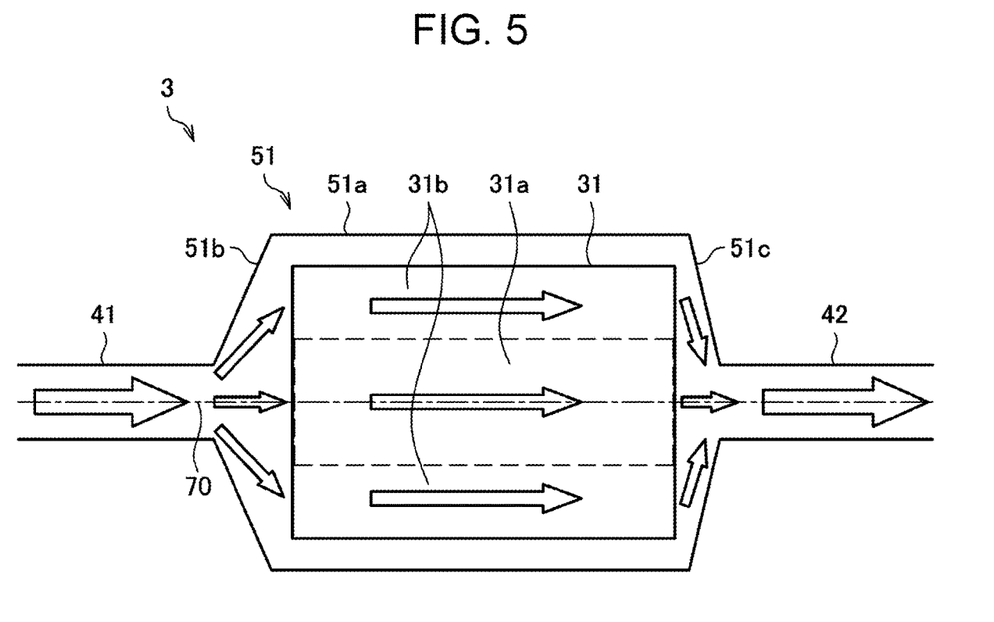
FIG. 5 schematically illustrates how exhaust gas passes through the three-way catalyst in times of NOx purge in the exhaust gas purification apparatus according to the embodiment of the disclosure.

FIG. 5 schematically illustrates how exhaust gas passes through the three-way catalyst 31 in times of NOx purge in the exhaust gas purification apparatus 3. As described above, the flow rate of the exhaust gas in times of NOx purge is smaller than in normal times. Therefore, in times of NOx purge, as represented by the arrows in FIG. 5, the exhaust gas that is sent from the first exhaust pipe 41 into the first housing 51 spreads outward in the radial direction in the first flared portion 51b while flowing toward the downstream side. Hence, in the three-way catalyst 31, the exhaust gas passes through both the first region 31a and the second region 31b. That is, in the three-way catalyst 31, the exhaust gas is dispersed over the first region 31a and the second region 31b. The exhaust gas having passed through the first region 31a and the second region 31b flows through the second flared portion 51c and is sent into the second exhaust pipe 42.

To summarize, the three-way catalyst 31 of the exhaust gas purification apparatus 3 includes the first region 31a and the second region 31b, the second region 31b having a lower OSC than the first region 31a. The first region 31a is located on the center axis 70 of the flow of the gas that is sent from the first exhaust pipe 41 into the first housing 51. Therefore, in normal times, the exhaust gas that is sent from the first exhaust pipe 41 into the first housing 51 passes through the first region 31a of the three-way catalyst 31. Thus, the effect of the OSC of the three-way catalyst 31 is improved. On the other hand, in times of NOx purge, some of the exhaust gas that is sent from the first exhaust pipe 41 into the first housing 51 passes through the second region 31b. Therefore, the reaction between the components of the exhaust gas that are used for NOx purification and the oxygen stored in the three-way catalyst 31 is reduced. Thus, the increase in the amount of fuel to be used for NOx purge is reduced, which increases fuel efficiency.

In the first housing 51 illustrated in FIGS. 4 and 5, the degree of flaring of the first flared portion 51b is smaller than the degree of flaring of the second flared portion 51c. The degree of flaring refers to the degree of increase in the inside diameter per unit length in the axial direction. The degree of flaring may be regarded as, for example, the size of the taper. In the case illustrated in FIGS. 4 and 5, the first flared portion 51b forms a smaller taper than the second flared portion 51c. Such a configuration improves the effect of causing the exhaust gas that is sent from the first exhaust pipe 41 into the first housing 51 in times of NOx purge to spread outward in the radial direction in the first flared portion 51b and to be sent into the second region 31b of the three-way catalyst 31.

Figure 6:
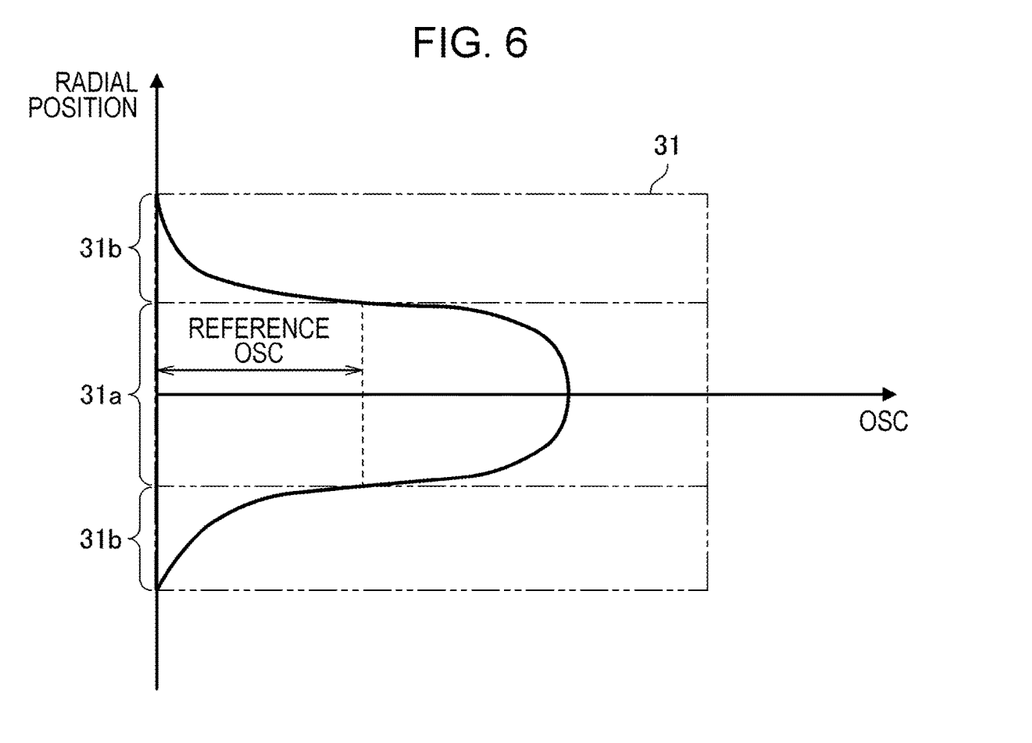
FIG. 6 illustrates an exemplary distribution of the oxygen storage capacity (OSC) of the three-way catalyst according to the embodiment of the disclosure.

FIG. 6 illustrates an exemplary distribution of the OSC of the three-way catalyst 31. The distribution of the OSC of the three-way catalyst 31 in FIG. 6 is graphed with respect to the position in the radial direction. In FIG. 6, the vertical axis represents the position of the three-way catalyst 31 in the radial direction, and the horizontal axis represents OSC. In FIG. 6, the horizontal axis coincides with the center axis of the three-way catalyst 31. In the case illustrated in FIG. 6, the OSC of the three-way catalyst 31 is highest at the center axis of the three-way catalyst 31. The OSC of the three-way catalyst 31 becomes lower from the center axis of the three-way catalyst 31 toward the outer side in the radial direction. The first region 31a corresponds to a region where the OSC is higher than the reference OSC. The second region 31b corresponds to a region where the OSC is lower than or equal to the reference OSC.

In the exhaust gas purification apparatus 3, the center axis of the three-way catalyst 31 coincides with the center axis 70 (see FIGS. 4 and 5) of the flow of the gas that is sent from the first exhaust pipe 41 into the first housing 51. Accordingly, in the case illustrated in FIG. 6, the OSC of the three-way catalyst 31 is distributed in such a manner as to become lower in the direction away from the center axis 70. Thus, the OSC is made high in the first region 31a located on the center axis 70 of the flow of the gas that is sent from the first exhaust pipe 41 into the first housing 51 but low in the second region 31b. Furthermore, the flow rate of the exhaust gas that is sent from the first exhaust pipe 41 into the first housing 51 is distributed in such a manner as to become smaller in the direction away from the center axis 70. That is, the OSC of the three-way catalyst 31 is distributed in the same manner as the flow rate of the exhaust gas in the first housing 51: in such a manner as to become lower in the direction away from the center axis 70. Thus, the effect of the OSC of the three-way catalyst 31 in normal times is further improved.

The above description relates to an exemplary distribution of the OSC of the three-way catalyst 31 that is illustrated in FIG. 6. However, the distribution of the OSC of the three-way catalyst 31 is not limited to the one illustrated in FIG. 6. For example, the OSC of the three-way catalyst 31 may change stepwise in the radial direction. As another example, the distribution of the OSC of the three-way catalyst 31 may include a portion where the OSC becomes higher in the direction away from the center axis 70. As yet another example, the OSC in the first region 31a may be constant regardless of the position in the radial direction. As yet another example, the OSC in the second region 31b may be constant regardless of the position in the radial direction.

Effects of Exhaust Gas Purification Apparatus

Effects produced by the exhaust gas purification apparatus 3 according to the embodiment of the disclosure will now be described.

The three-way catalyst 31 of the exhaust gas purification apparatus 3 according to the present embodiment includes the first region 31a and the second region 31b, the second region 31b having a lower OSC than the first region 31a. The first region 31a is located on the center axis 70 of the flow of the gas that is sent from the first exhaust pipe 41 into the first housing 51. Therefore, in normal times, the exhaust gas passes through the first region 31a of the three-way catalyst 31. Thus, the effect of the OSC of the three-way catalyst 31 is improved. On the other hand, in times of NOx purge, some of the exhaust gas that is sent from the first exhaust pipe 41 into the first housing 51 passes through the second region 31b. Therefore, the reaction between the components of the exhaust gas that are used for NOx purification and the oxygen stored in the three-way catalyst 31 is reduced. Thus, the increase in the amount of fuel to be used for NOx purge is reduced, which increases fuel efficiency.

In the exhaust gas purification apparatus 3 according to the present embodiment, the first region 31a may be located on a virtual line extended from the first exhaust pipe 41. Such a configuration improves the effect of causing the exhaust gas in normal times to pass through the first region 31a of the three-way catalyst 31 while some of the exhaust gas passing through the three-way catalyst 31 in times of NOx purge to pass through the second region 31b. Thus, the effect of reducing the increase in the amount of fuel to be used for NOx purge is improved.

In the exhaust gas purification apparatus 3 according to the present embodiment, the OSC of the three-way catalyst 31 may be distributed in such a manner as to become lower in the direction away from the center axis 70 of the gas that is sent from the first exhaust pipe 41 into the first housing 51. That is, the OSC is made high in the first region 31a located on the center axis 70 but low in the second region 31b. Thus, the effect of reducing the increase in the amount of fuel to be used for NOx purge is improved. Furthermore, the OSC of the three-way catalyst 31 is distributed in the same manner as the flow rate of the exhaust gas in the first housing 51: in such a manner as to become lower in the direction away from the center axis 70. Thus, the effect of the OSC of the three-way catalyst 31 in normal times is further improved.

The first housing 51 of the exhaust gas purification apparatus 3 according to the present embodiment may include the cylindrical portion 51a in which the three-way catalyst 31 is disposed, the first flared portion 51b that couples the first exhaust pipe 41 and the cylindrical portion 51a to each other and that has a diameter increasing from the upstream side toward the downstream side, and the second flared portion 51c that couples the second exhaust pipe 42 and the cylindrical portion 51a to each other and that has a diameter increasing from the downstream side toward the upstream side. The degree of flaring of the first flared portion 51b may be smaller than the degree of flaring of the second flared portion 51c. Such a configuration improves the effect of causing the exhaust gas that is sent from the first exhaust pipe 41 into the first housing 51 in times of NOx purge to spread outward in the radial direction in the first flared portion 51b and to be sent into the second region 31b of the three-way catalyst 31. Thus, the effect of reducing the increase in the amount of fuel to be used for NOx purge is improved.

Modification

Figure 7:
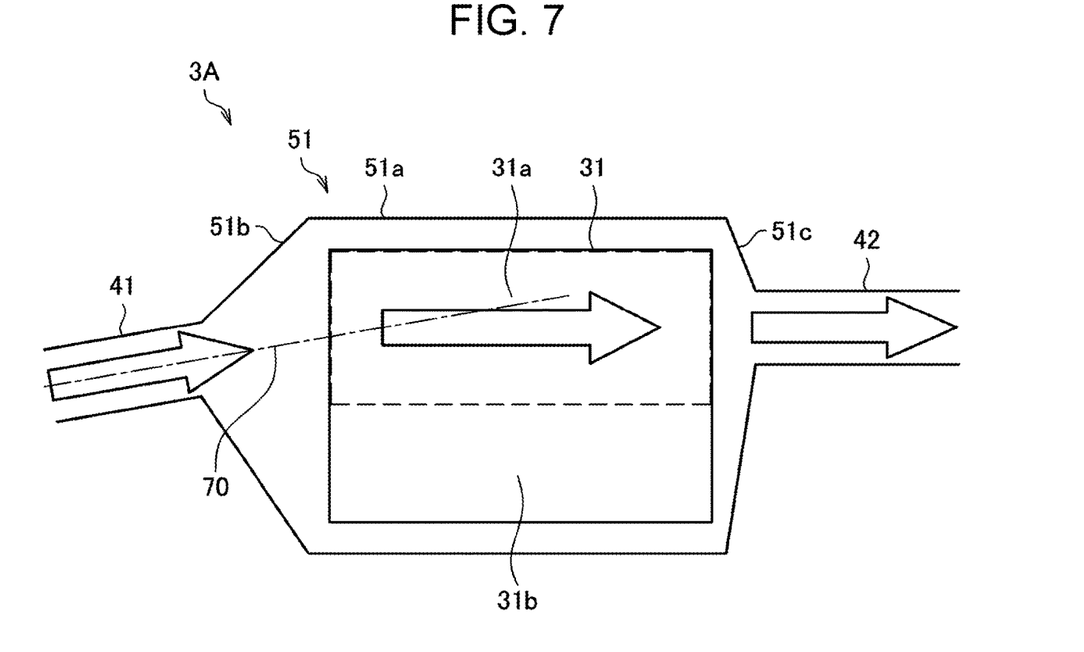
FIG. 7 schematically illustrates how exhaust gas passes through a three-way catalyst in normal times in an exhaust gas purification apparatus according to a modification.
Figure 8:
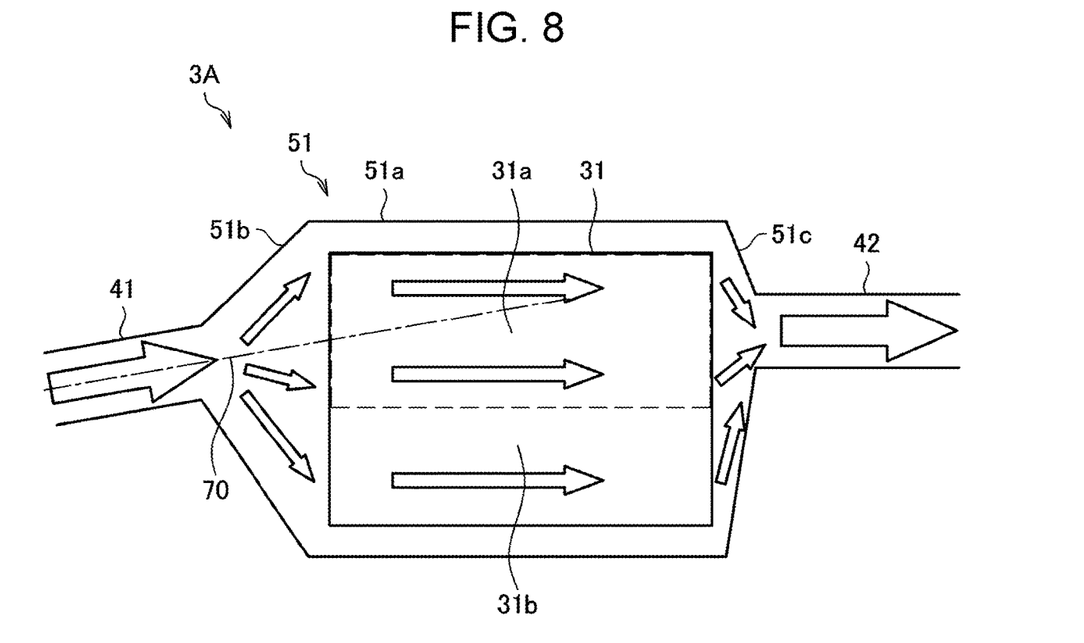
FIG. 8 schematically illustrates how exhaust gas passes through the three-way catalyst in times of NOx purge in the exhaust gas purification apparatus according to the modification.

Referring to FIGS. 7 and 8, an exhaust gas purification apparatus 3A according to a modification will now be described. The exhaust gas purification apparatus 3A is different from the exhaust gas purification apparatus 3 described above in the configuration including the three-way catalyst 31 and relevant elements disposed therearound. The three-way catalyst 31 and relevant elements disposed therearound in the exhaust gas purification apparatus 3A are configured as follows.

FIG. 7 schematically illustrates how exhaust gas passes through the three-way catalyst 31 in normal times in the exhaust gas purification apparatus 3A. As illustrated in FIG. 7, the first housing 51 that houses the three-way catalyst 31 includes a cylindrical portion 51a, a first flared portion 51b, and a second flared portion 51c, as with the case of the exhaust gas purification apparatus 3 described above. The first exhaust pipe 41 and the cylindrical portion 51a are coupled to each other with the first flared portion 51b in between. The second exhaust pipe 42 and the cylindrical portion 51a are coupled to each other with the second flared portion 51c in between.

The exhaust gas purification apparatus 3A is different from the exhaust gas purification apparatus 3 in that the first exhaust pipe 41 is inclined relative to the center axis of the cylindrical portion 51a. The second exhaust pipe 42 extends parallel to the cylindrical portion 51a but is not coaxial with the cylindrical portion 51a. In the modification illustrated in FIG. 7, the center axis of the first exhaust pipe 41 (that is, the center axis 70 of the flow of the gas that is sent from the first exhaust pipe 41 into the first housing 51) is inclined toward the upper side in FIG. 7 (hereinafter simply expressed as the "upper" side or the like) while extending toward the downstream side. The center axis 70 of the flow of the gas that is sent from the first exhaust pipe 41 into the first housing 51 passes through an upper portion of the three-way catalyst 31. Accordingly, in the exhaust gas purification apparatus 3A illustrated in FIG. 7, the first region 31a of the three-way catalyst 31 occupies an upper portion of the three-way catalyst 31. In FIG. 7, the first region 31a is defined by a broken line. On the other hand, the second region 31b occupies a lower portion of the three-way catalyst 31.

In normal times in which the flow rate of the exhaust gas is greater than in times of NOx purge, as represented by the arrows in FIG. 7, the exhaust gas that is sent from the first exhaust pipe 41 into the first housing 51 basically flows along the center axis 70 in the first housing 51. Therefore, the exhaust gas basically passes through the first region 31a of the three-way catalyst 31, not the second region 31b. The center axis of the second exhaust pipe 42 extends above the center axis of the cylindrical portion 51a. Accordingly, the second exhaust pipe 42 faces the first region 31a in the axial direction of the three-way catalyst 31. Therefore, the exhaust gas having passed through the first region 31a is smoothly sent into the second exhaust pipe 42.

FIG. 8 schematically illustrates how exhaust gas passes through the three-way catalyst 31 in times of NOx purge in the exhaust gas purification apparatus 3A. In times of NOx purge, as represented by the arrows in FIG. 8, the exhaust gas that is sent from the first exhaust pipe 41 into the first housing 51 spreads outward in the radial direction in the first flared portion 51b while flowing toward the downstream side. Hence, in the three-way catalyst 31, the exhaust gas passes through both the first region 31a and the second region 31b. That is, in the three-way catalyst 31, the exhaust gas is dispersed over the first region 31a and the second region 31b. The exhaust gas having passed through the first region 31a and the second region 31b flows through the second flared portion 51c and is sent into the second exhaust pipe 42.

To summarize, as with the case of the exhaust gas purification apparatus 3 described above, the three-way catalyst 31 of the exhaust gas purification apparatus 3A includes the first region 31a and the second region 31b, the second region 31b having a lower OSC than the first region 31a. The first region 31a is located on the center axis 70 of the flow of the gas that is sent from the first exhaust pipe 41 into the first housing 51. Thus, as with the case of the exhaust gas purification apparatus 3 described above, the increase in the amount of fuel to be used for NOx purge is reduced, which increases fuel efficiency.

As to be understood from the above, the positions of the first exhaust pipe 41 and the second exhaust pipe 42 relative to the first housing 51 are not limited. Furthermore, the orientations of the first exhaust pipe 41 and the second exhaust pipe 42 relative to the first housing 51 are not limited.

While an embodiment of the disclosure has been described with reference to the accompanying drawings, the disclosure is not limited to the above embodiment. It is to be understood that various changes and modifications to be made within the scope of the disclosure that is defined by the appended claims are within the technical scope of the disclosure.

For example, the processing operation described above with reference to the flow chart may be executed in an order different from that of the flow chart. Moreover, any additional processing steps may be employed, or some of the processing steps may be omitted.

The invention claimed is:
1. An exhaust gas purification apparatus comprising:
a first exhaust pipe that is coupled to an engine;
a first housing that is coupled to a downstream end of the first exhaust pipe and that houses a three-way catalyst;
a second exhaust pipe that is coupled to a downstream end of the first housing; and
a second housing that is coupled to a downstream end of the second exhaust pipe and that houses a nitrogen oxide occlusion catalyst,
wherein the three-way catalyst comprises a first region and a second region, the second region having a lower oxygen storage capacity than the first region, and
wherein the first region is located on a center axis of a flow of gas that is to be sent from the first exhaust pipe into the first housing,
wherein the first housing comprises:

a first flared portion that couples to the first exhaust pipe and that has a diameter increasing from an upstream side toward a downstream side; and a second flared portion that couples to the second exhaust pipe and that has a diameter increasing from the downstream side toward the upstream side, and wherein a degree of flaring of the first flared portion is different than a degree of flaring of the second flared portion.

2. The exhaust gas purification apparatus according to claim 1, wherein the first region is located on a virtual line extended from the first exhaust pipe.

3. The exhaust gas purification apparatus according to claim 2, wherein the oxygen storage capacity of the three-way catalyst is distributed in such a manner as to become lower in a direction away from the center axis.

4. The exhaust gas purification apparatus according to claim 3,
wherein the first housing comprises a cylindrical portion in which the three-way catalyst is disposed,
wherein the first flared portion couples the first exhaust pipe and the cylindrical portion to each other, and
wherein the second flared portion couples the second exhaust pipe and the cylindrical portion to each other.

5. The exhaust gas purification apparatus according to claim 2,
wherein the first housing comprises a cylindrical portion in which the three-way catalyst is disposed,
wherein the first flared portion couples the first exhaust pipe and the cylindrical portion to each other, and
wherein the second flared portion couples the second exhaust pipe and the cylindrical portion to each other.

6. The exhaust gas purification apparatus according to claim 1, wherein the oxygen storage capacity of the three-way catalyst is distributed in such a manner as to become lower in a direction away from the center axis.

7. The exhaust gas purification apparatus according to claim 6,
wherein the first housing comprises a cylindrical portion in which the three-way catalyst is disposed,
wherein the first flared portion couples the first exhaust pipe and the cylindrical portion to each other, and
wherein the second flared portion couples the second exhaust pipe and the cylindrical portion to each other.

8. An exhaust gas purification apparatus comprising:
a first exhaust pipe that is coupled to an engine;
a first housing that is coupled to a downstream end of the first exhaust pipe and that houses a three-way catalyst;
a second exhaust pipe that is coupled to a downstream end of the first housing; and
a second housing that is coupled to a downstream end of the second exhaust pipe and that houses a nitrogen oxide occlusion catalyst,
wherein the three-way catalyst comprises a first region and a second region, the second region having a lower oxygen storage capacity than the first region,
wherein the first region is located on a center axis of a flow of gas that is to be sent from the first exhaust pipe into the first housing,
wherein the first housing comprises:
a cylindrical portion in which the three-way catalyst is disposed;
a first flared portion that couples the first exhaust pipe and the cylindrical portion to each other and that has a diameter increasing from an upstream side toward a downstream side; and
a second flared portion that couples the second exhaust pipe and the cylindrical portion to each other and that has a diameter increasing from the downstream side toward the upstream side, and
wherein a degree of flaring of the first flared portion is smaller than a degree of flaring of the second flared portion.

9. The exhaust gas purification apparatus according to claim 1, wherein the first exhaust pipe is inclined relative to the center axis of the flow of gas.

10. The exhaust gas purification apparatus according to claim 9, wherein a center axis of the second exhaust pipe is misaligned with the center axis of the flow of gas.

11. The exhaust gas purification apparatus according to claim 1, wherein a center axis of the first exhaust pipe is inclined towards an upper side of the first housing.

12. The exhaust gas purification apparatus according to claim 11, wherein a center axis of the second exhaust pipe is misaligned with the center axis of the flow of gas.

13. The exhaust gas purification apparatus according to claim 1, wherein a center axis of the second exhaust pipe is misaligned with the center axis of the flow of gas.

14. The exhaust gas purification apparatus according to claim 1, wherein a center axis of the first exhaust pipe is inclined with respect to a center axis of the second exhaust pipe.

15. The exhaust gas purification apparatus according to claim 1, further comprising
a first sensor on an upstream side of the second housing; and
a second sensor on a downstream side of the second housing.

16. An exhaust gas purification apparatus comprising:
a first exhaust pipe that is coupled to an engine;
a first housing that is coupled to a downstream end of the first exhaust pipe and that houses a three-way catalyst;
a second exhaust pipe that is coupled to a downstream end of the first housing; and
a second housing that is coupled to a downstream end of the second exhaust pipe and that houses a nitrogen oxide occlusion catalyst,
wherein the three-way catalyst comprises a first region and a second region, the second region having a lower oxygen storage capacity than the first region,
wherein the first region is located on a center axis of a flow of gas that is to be sent from the first exhaust pipe into the first housing, and
wherein a center axis of the first exhaust pipe is inclined with respect to a center axis of the second exhaust pipe.

17. The exhaust gas purification apparatus according to claim 16, wherein the first housing comprises:
a cylindrical portion in which the three-way catalyst is disposed;
a first flared portion that couples the first exhaust pipe and the cylindrical portion to each other and that has a diameter increasing from an upstream side toward a downstream side; and
a second flared portion that couples the second exhaust pipe and the cylindrical portion to each other and that has a diameter increasing from the downstream side toward the upstream side, and
wherein a degree of flaring of the first flared portion is smaller than a degree of flaring of the second flared portion.

18. The exhaust gas purification apparatus according to claim 16, further comprising a first sensor on an upstream side of the second housing; and a second sensor on a downstream side of the second housing.

\* \* \* \* \*